(12) United States Patent
Sueyoshi et al.

(10) Patent No.: US 11,283,339 B2
(45) Date of Patent: Mar. 22, 2022

(54) STEPPING MOTOR

(71) Applicant: MINEBEA MITSUMI Inc., Nagano (JP)

(72) Inventors: Nobuyuki Sueyoshi, Kosai (JP); Mitsuo Kinoshita, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 93 days.

(21) Appl. No.: 16/986,607

(22) Filed: Aug. 6, 2020

(65) Prior Publication Data
US 2021/0044193 A1 Feb. 11, 2021

(30) Foreign Application Priority Data
Aug. 9, 2019 (JP) .............................. JP2019-147161

(51) Int. Cl.
H02K 37/14 (2006.01)
H02K 37/24 (2006.01)
H02K 7/08 (2006.01)

(52) U.S. Cl.
CPC .............. *H02K 37/14* (2013.01); *H02K 7/083* (2013.01); *H02K 37/24* (2013.01); *H02K 2213/03* (2013.01)

(58) Field of Classification Search
CPC ........ H02K 37/00; H02K 37/14; H02K 37/24; H02K 7/083; H02K 2213/03
See application file for complete search history.

(56) References Cited

U.S. PATENT DOCUMENTS

| 7,015,604 B2 * | 3/2006 | Iwase | ..................... H02K 5/15 310/49.36 |
| 7,420,303 B2 * | 9/2008 | Nishimura | ............. H02K 7/081 310/49.08 |

(Continued)

FOREIGN PATENT DOCUMENTS

JP 2014-003832 A 1/2014

*Primary Examiner* — Dang D Le
(74) *Attorney, Agent, or Firm* — Pearne & Gordon LLP

(57) ABSTRACT

A stepping motor has a relationship between an outer diameter of a rotor and an outer diameter of a bearing made of magnetic material that can be adjusted appropriately so as to impart magnetic attractive force to the bearing, the stepping motor including a rotor 400 made of a permanent magnet, a stator including multiple pole teeth 223, 243, 323 and 343 extending in an axial direction of the rotor 400 arranged at an outer circumferential side of the rotor 400, a bearing 250 rotatably supporting one end portion in the axial direction of the rotor 400, and a bearing 260 rotatably supporting the other end portion in the axial direction of the rotor 400. Magnetic permeability of the bearing 260 is greater than that of the bearing 250, the rotor 400 includes multiple magnetic poles on an outer circumferential surface along a circumferential direction of the rotor 400, and an outer diameter $D_R$ of the rotor 400, an outer diameter $D_B$ of a portion of the bearing 260 which is facing the rotor 400, and a pitch P of the multiple magnetic poles of the rotor 400 are set to satisfy the following relationship of formula 1

$(D_R-P) = <D_B = <D_R$   (Formula 1).

8 Claims, 3 Drawing Sheets

(56) References Cited

U.S. PATENT DOCUMENTS

| | | | |
|---|---|---|---|
| 9,705,391 B2 | 7/2017 | Asano | |
| 2013/0093268 A1* | 4/2013 | Sano | ............... H02K 37/14 310/49.53 |
| 2013/0334908 A1 | 12/2013 | Asano | |

* cited by examiner

STEPPING MOTOR

TECHNICAL FIELD

The present invention relates to stepping motors, and in particular, relates to PM-type (Permanent Magnet-type) stepping motors having a rotor which is a permanent magnet and a stator having multiple pole teeth extending in an axial direction at an outer circumferential side of the rotor.

BACKGROUND ART

Conventionally, in the abovementioned PM-type stepping motor, a bearing rotatably supporting the rotor is installed, and there is a gap along the axial direction between the rotor and the bearing. For example, in a two-phase PM-type stepping motor, there is a phenomenon due to combination of excitation of two stators, in which the magnetic centers of the rotor and the stator are misaligned during driving of the stepping motor, and the rotor moves along an axial direction, thereby causing abnormal noise by collision with the bearing.

To solve this phenomenon, a stepping motor is known in which a magnetic attractive force generating member attracting a rotor in the axial direction is arranged, and the rotor is attracted to one bearing, thereby reducing striking noise by collision with the other bearing (see Patent Document 1)

The stepping motor disclosed in Patent Document 1 is a two-phase PM-type stepping motor including a rotor magnet which is a permanent magnet and a stator having multiple pole teeth extending in an axial direction at a circumferential side of the rotor, and having a structure in which a magnetic washer as the magnetic attractive force generating member made of magnetic material affixed to a case plate metal fixing the bearing. In this stepping motor, outer diameter $D_{M1}$ of the magnetic washer and outer diameter $D_R$ of the rotor magnet are set to satisfy a relationship $D_{M1} = <D_R$ (see claim 3). In addition, the rotor magnet is attracted to the magnetic washer side so as to reduce striking noise during rotation driving of the stepping motor.

Patent Document 1 is Japanese Unexamined Patent Application Publication No. 2014-3832

SUMMARY OF THE INVENTION

However, in a case in which the stepping motor is used in an electronic device, such as a mobile phone, such as a smart phone, an outer diameter of the stepping motor is not more than 6 mm, and an outer diameter of the rotor of such a stepping motor is very small, being not more than 3 mm. In such a case of a very small diameter motor, it is difficult to obtain a space to arrange the magnetic washer of the Patent Document 1. Therefore, it can be considered that the bearing itself is formed by a magnetic material instead of the magnetic washer.

On the other hand, the Patent Document 1 also discloses that instead of the magnetic washer and the bearing, a bearing made of a magnetic material and enlarged in a radial direction can be used as the magnetic attractive force generating member. (see [0041]). In that case, since it is assumed that an outer diameter of the bearing made of a magnetic material and enlarged in a radial direction is similar to an outer diameter $D_{M1}$ of the magnetic washer, $D_{M1}$ (outer diameter of the bearing) and $D_R$ (outer diameter of the rotor magnet) are set so as to satisfy the relationship $D_{M1} = <D_R$.

However, in Patent Document 1, it is unclear whether or not the striking noise occurring during rotation driving of the stepping motor is always reduced if $D_{M1}$ and $D_R$ satisfy the above relationship. Furthermore, the rotor magnet in Patent Document 1 is magnetized at the bottom surface thereof facing the magnetic washer in addition to the side surface thereof facing the excitation stator. Therefore, it is unclear whether or not the abovementioned effect can be obtained even in a case in which the bottom surface of the rotor magnet is not magnetized.

The present invention has been completed in view of the above circumstances, and an object of the present invention is to provide a stepping motor in which a relationship between the outer diameter of a rotor and the outer diameter of a bearing made of magnetic material are appropriately adjusted in a case in which the bearing made of magnetic material is used as a magnetic attractive force generating member instead of a magnetic washer and a bearing.

The present invention is a stepping motor including: a rotor made of a permanent magnet, a stator including multiple pole teeth extending in an axial direction of the rotor arranged at an outer circumferential side of the rotor, a primary bearing rotatably supporting one end portion in the axial direction of the rotor, and a secondary bearing rotatably supporting the other end portion in the axial direction of the rotor, in which magnetic permeability of the secondary bearing is greater than that of the primary bearing, the rotor includes multiple magnetic poles on an outer circumferential surface along a circumferential direction of the rotor, and an outer diameter $D_R$ of the rotor, an outer diameter $D_B$ of a portion of the secondary bearing which is facing the rotor, and a pitch P of the multiple magnetic poles of the rotor are set to satisfy the following relationship of Formula 1.

$$(D_R - P) = <D_B = <D_R \qquad \text{(Formula 1)}$$

In the present invention, since magnetic permeability of the secondary bearing is set higher than that of the primary bearing, magnetic force (magnetic flux) of the rotor acts more strongly at the secondary bearing than at the primary bearing, and magnetic attractive force to the rotor is generated at the secondary bearing. Here, at the magnetic poles at the magnetized circumferential surface of the rotor, magnetic force acts over a range of about ½ of the pitch P of the magnetic poles along a depth direction from the outer circumferential surface. Therefore, in the present invention, since $D_B/2$ is not less than $(D_R/2 - P/2)$, magnetic force of the magnetic poles of the rotor acts at the secondary bearing, and the rotor is attracted by the secondary bearing. In this way, striking noise occurring during rotation driving of the stepping motor can be reduced.

In the present invention, action and effect based on Formula 1 can be obtained only in a case in which the magnetic poles are arranged only on the outer circumferential surface of the rotor. However, in a case in which the magnetic poles are arranged on an end surface of the rotor, since greater magnetic force acts at the secondary bearing, the present invention does not exclude such an embodiment.

In the present invention, it is desirable that the secondary bearing include a small diameter portion and a large diameter portion, the small diameter portion be affixed to a covering member, and the large diameter portion face an end surface of the rotor. In this way, the size of the secondary bearing can be reduced, thereby reducing material cost, and the secondary bearing can be attached to the covering member via a step portion between the small diameter portion and the large diameter portion.

In the present invention, by arranging a resin washer between the rotor and the secondary bearing, metals of the rotor and the secondary bearing are prevented from making contact with each other, thereby avoiding the occurrence of abnormal noise.

According to the present invention, the stepping motor in which the relationship between the outer diameter of a rotor and the outer diameter of a bearing made of magnetic material is adjusted appropriately can be provided in a case in which the bearing made of magnetic material is used as a magnetic attractive force generating member instead of a magnetic washer and a bearing.

BEST MODE FOR CARRYING OUT THE INVENTION

1. Overall Structure of Stepping Motor

Figure 1:
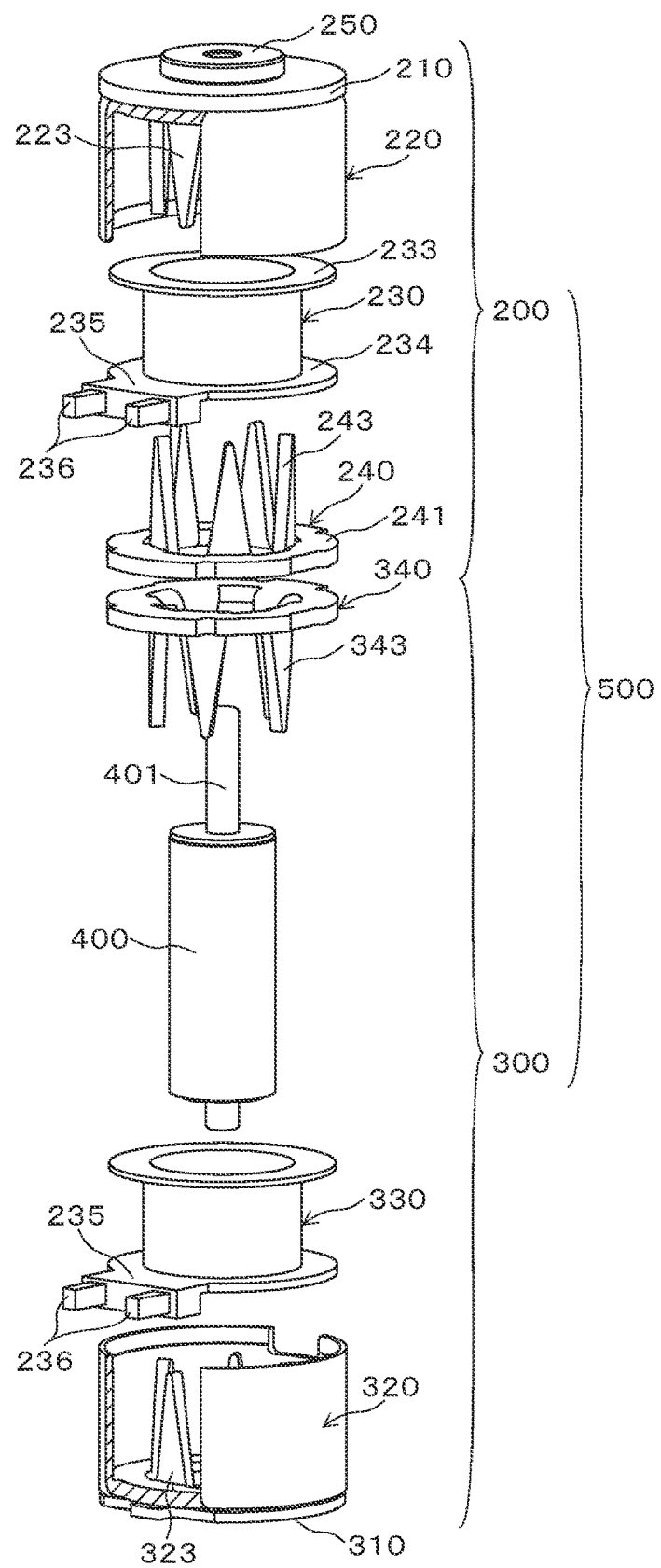
FIG. 1 is a partially broken exploded perspective view of the stepping motor of the embodiment of the present invention.
Figure 2:
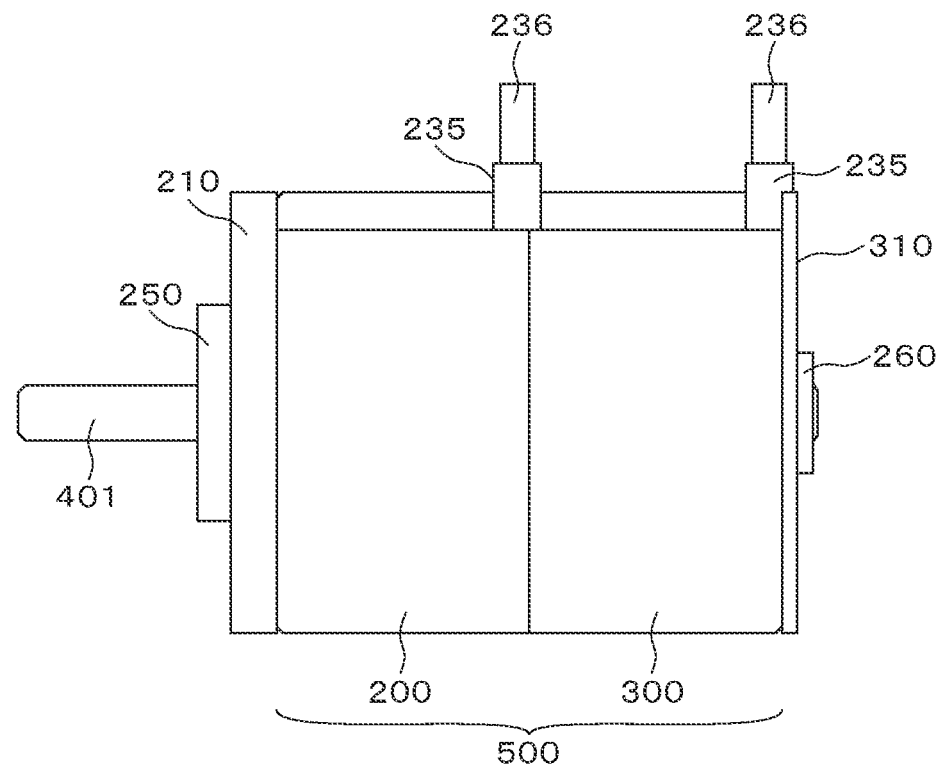
FIG. 2 is a side view of the stepping motor of the embodiment of the present invention.

FIG. 1 shows a stepping motor 100 of the embodiment. The stepping motor 100 is a claw-pole-type two-phase PM-type (Permanent Magnet-type) stepping motor. The stepping motor 100 includes a stator 500. The stator 500 has a structure in which an A phase stator unit 200 and a B phase stator unit 300 are combined in an axial direction. Here, the A phase stator unit 200 and the B phase stator unit 300 have the same structure, and one is opposite to the other in an axial direction, back surfaces thereof are in contact and are combined, thereby constructing the stator 500.

A front plate 210 is fixed to the A phase stator unit 200, and an end plate 310 is fixed to the B phase stator unit 300. The stator 500 has a substantially cylindrical shape, and a rotor 400 is contained therein in a rotatable condition.

The A phase stator unit 200 has a structure in which an outer yoke 220, a bobbin 230, and an inner yoke 240 are combined in an axial direction. The outer yoke 220 is a portion which functions as a yoke at which a magnetic path is formed, and is made of a magnetic material such as electromagnetic soft iron or rolled steel plate. The outer yoke 220 has a shape which is substantially cup-shaped, the central portion of which is open, and has substantially triangular poles 223 which extend from an end portion of the opening portion in an axial direction and which are multiply arranged along a circumferential direction with a certain gap therebetween.

A coil 231 (shown only in FIG. 3) is wound around the bobbin 230. The bobbin 230 is made of resin and is formed by an injection molding method. Flange portions 233 and 234 are formed at both ends along an axial direction of the bobbin 230 in order to prevent releasing of the winding of the coil 231. At one flange portion 234, a terminal block 235 is formed. The terminal block 235 is a rectangular block which protrudes from the flange portion 234 in an axial direction and in a radial direction and is integrally formed with the flange portion 234. Multiple (in this embodiment, two) metallic terminal pins 236 are disposed in the terminal block 235 by a method such as press fitting or insert molding.

The bobbin 230 having the abovementioned structure is arranged sandwiched by the outer yoke 220 and the inner yoke 240, thereby constructing the A phase stator unit 200. Furthermore, a bobbin 330 of the B phase stator unit 300 is also similarly arranged sandwiched by an outer yoke 320 and an inner yoke 340, thereby constructing the B phase stator unit 300.

The inner yoke 240 is a portion which functions as a yoke at which a magnetic path is formed, and is made of a magnetic material such as electromagnetic soft iron or rolled steel plate. The inner yoke 240 has a tabular circular ring portion 241 and substantially triangular pole teeth 243 which extend from an end portion of an inner circumferential side of the circular ring portion 241 to an axial direction and which are multiply arranged along a circumferential direction with a certain gap therebetween. The pole teeth 243 of the inner yoke 240 and pole teeth 223 of the outer yoke 220 are intermeshed with each other in a circumferential direction.

The inner yoke 340 of the B phase stator unit 300 is one which is reversing a member similar to the inner yoke 240 of the A phase stator unit 200 along an axial direction. By facing and contacting the same surfaces of the inner yoke 240 and the inner yoke 340, the A phase stator unit 200 and the B phase stator unit 300 are combined.

The front plate 210 is fixed with a surface of the outer yoke 220 opposite to the surface facing the bobbin 230. A bearing (primary bearing) 250 is attached to the front plate 210.

The B phase stator unit 300 has almost the same structure as that of the A phase stator unit 200, and one having almost the same structure as the A phase stator unit 200 is used in a reversed condition along an axial direction as the B phase stator unit 300. The B phase stator unit 300 has a structure in which an outer yoke 320, a bobbin 330, and an inner yoke 340 are combined in an axial direction. Here, the outer yoke 320 is a part having almost the same structure as the outer yoke 220, and includes substantially triangular pole teeth 323. The inner yoke 340 is a part having almost the same structure as the inner yoke 240, and includes substantially triangular pole teeth 343. The bobbin 330 is a part having almost the same structure as the bobbin 230. The end plate 310 is fixed with the outer yoke 320. A bearing (secondary bearing) 260 is attached to the end plate 310.

2. Details of Rotor and Supporting Structure Thereof

Figure 3:
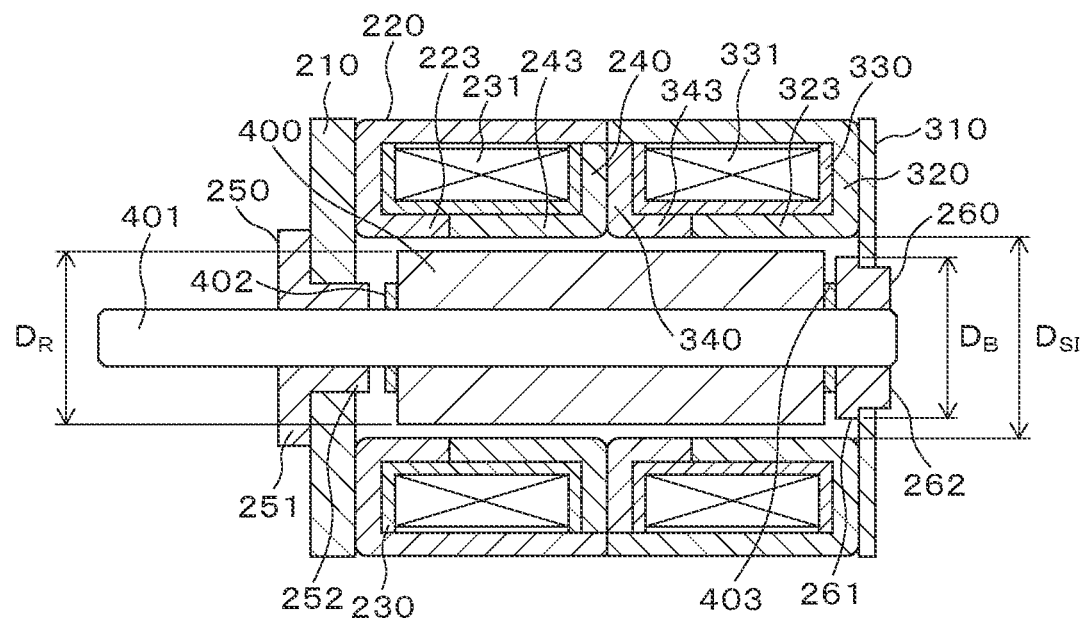
FIG. 3 is a side cross sectional view of the stepping motor of the embodiment of the present invention.

A shaft 401 is fixed to the axial center of the rotor 400 in a condition penetrating in an axial direction, one end portion of the shaft 401 protruding from the rotor 400 to the left side in FIG. 3 is rotatably supported by the front plate 210 via the bearing 250, and the other end portion of the shaft 401 protruding from the rotor 400 to the right side in FIG. 3 is rotatably supported by the end plate 310 via the bearing 260.

The bearing 250 of the A phase stator unit 200 is constructed by a copper-based oil-impregnated sintered bearing for example, and as shown in FIG. 3, has a two-step structure having a large diameter portion 251 and a small diameter portion 252, and is affixed by engaging the small diameter portion 252 into an opening of the front plate 210.

On the other hand, the bearing 260 of the B phase stator unit 300 is formed by a magnetic material (for example, an iron-copper-based oil-impregnated sintered bearing or an iron-based oil-impregnated sintered bearing), has a two-step structure having a large diameter portion 261 and a small diameter portion 262, and is affixed by engaging the small diameter portion 262 into an opening of the front plate 310. In addition, magnetic permeability of the bearing 260 is set higher than that of the bearing 250.

A resin washer 402 is attached on an end surface of the rotor 400 facing the bearing 250 side. Furthermore, a resin washer 403 is attached on an end surface of the rotor 400 facing the bearing 260 side. The relationship between the outer diameter $D_B$ of the large diameter portion 261 of the bearing 260 and the outer diameter $D_R$ of the rotor 400 is set as $D_B \mathrel{<}= D_R$.

Figure 4:
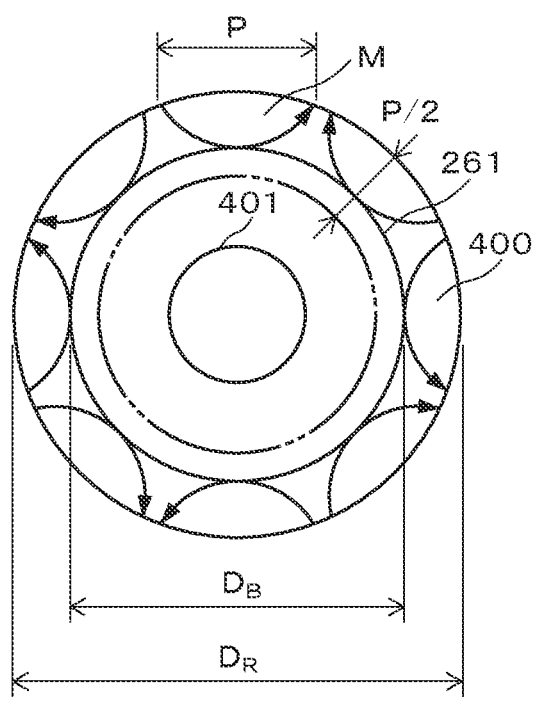
FIG. 4 is a diagram seen from a lower end surface along an axial direction of the rotor shown in FIG. 3, and a diagram explaining a relationship of the magnetic poles of the outer circumferential surface of the rotor and the bearing made of magnetic material.

The rotor 400 is made of a permanent magnet such as a ferrite magnet, a rare earth magnet, or the like, and has a substantially cylindrical structure. This permanent magnet has a magnetic pole M which is magnetized in a condition in which the magnetic pole alternates as NSNS along the circumferential direction of the outer circumferential surface thereof. FIG. 4 shows a situation in which eight poles are magnetized on the outer circumferential surface of the rotor 400, and the arrows in the figure indicate magnetic flux. In the magnetic pole M in which an outer circumferential surface of the rotor 400 is magnetized, magnetic force acts over a range of about ½ pitch P of the magnetic pole M from the outer circumferential surface in a depth direction, and the range is the area from the surface to the chain double-dashed line in FIG. 4.

Here, in order for the bearing 260 to function as a magnetic attractive force generating member, it is necessary that magnetic force (magnetic flux) of the rotor 400 affect the bearing 260. Therefore, it is necessary that the outer diameter $D_B$ of the large diameter portion 261 of the bearing 260 facing the end surface of the rotor 400 be set to be not less than the diameter of the circular arc (circular arc indicated by chain double-dashed line) at a position of a depth of about ½ of the magnetic pole pitch P from the outer circumferential surface of the rotor 400, and desirably be closer to the outer circumferential surface side. In particular, it is set to be relationship $(D_R-P) \mathrel{<}= D_B \mathrel{<}= D_R$.

Since the outer diameter $D_B$ of the large diameter portion 261 of the bearing 260 is set with a relationship $(D_R-P) \mathrel{<}= D_B \mathrel{<}= D_R$, leakage magnetic force (magnetic flux) from the end surface of the rotor 400 affects the large diameter portion 261 of the bearing 260, and the bearing acts as the magnetic attractive force generating member. Therefore, the rotor 400 is attracted to the bearing 260 side, and the end surface of the rotor 400 contacts the resin washer 403.

In a case in which exciting current is supplied on the coils 231 and 331 wound around the bobbins 230 and 330, the rotor 400 rotates by an interaction between magnetic flux excited in the stator 500 and magnetic flux of the rotor 400 which is a permanent magnet. According to a combination of an excitation method of the stator 500, when only the A phase stator unit 200 is excited (one phase excitation), although magnetic centers of the rotor 400 and the stator 500 are misaligned and thereby generates a force which moves the rotor 400 to the bearing 250 side, the movement of the rotor 400 in an axial direction is restrained by magnetic attractive force generated by the bearing 260 which is made of magnetic material. Therefore, the striking noise generated during rotation driving of the stepping motor 100 can be reduced.

It should be noted that movement of the rotor 400 along an axial direction can be blocked by setting magnetic attractive force acting between the bearing 260 made of magnetic material and the rotor 400 to be greater than magnetic force acting in an axial direction of the rotor 400 (direction of bearing 250). Such setting can be achieved, for example, by adjusting thickness (size in an axial direction) of the resin washer 403 arranged between the bearing 260 and the rotor 400, or by adjusting magnetic permeability of the bearing 260.

In particular, in the above embodiment, size of the bearing 260 can be reduced so as to reduce material cost, and the step portion between the small diameter portion 262 and the large diameter portion 261 can be attached to the end plate 310, since the bearing 260 has the small diameter portion 262 and the large diameter portion 261, the small diameter portion 262 is affixed to the end plate 310, and the large diameter portion 261 faces to an end surface of the rotor 400.

In the above embodiment, since the resin washer 403 is arranged between the rotor 400 and the bearing 260, metals of the rotor 400 and the bearing 260 can be prevented from making contact, thereby preventing occurrence of abnormal noise.

3. Modifications

The present invention is not limited to only a claw-pole-type two-phase stepping motor as mentioned above in the embodiments, and it can be applied to other multiphase PM-type stepping motors.

The present invention can be applied to the technical field of stepping motors.

EXPLANATION OF REFERENCE NUMERALS

100: Stepping motor, 200: A phase stator unit, 210: front plate, 220: outer yoke, 223: pole tooth, 230: bobbin, 231: coil, 233: flange portion, 234: flange portion, 235: terminal block, 236: terminal pin, 240: inner yoke, 241: circular ring portion, 243: pole tooth, 250: bearing (primary bearing), 251: large diameter portion, 252: small diameter portion, 260: bearing (secondary bearing), 261: large diameter portion, 262: small diameter portion, 300: B phase stator unit, 310: end plate, 320: outer yoke, 323: pole tooth, 330: bobbin, 331: coil, 340: inner yoke, 343: pole tooth, 400: rotor, 401: shaft, 402: resin washer, 403: resin washer, 500: stator, M: magnetic pole.

What is claimed is:
1. A stepping motor comprising:
a rotor made of a permanent magnet,
a stator including multiple pole teeth extending in an axial direction of the rotor arranged at an outer circumferential side of the rotor,
a primary bearing rotatably supporting one end portion in the axial direction of the rotor, and
a secondary bearing rotatably supporting the other end portion in the axial direction of the rotor,
wherein magnetic permeability of the secondary bearing is higher than that of the primary bearing,
the rotor includes multiple magnetic poles on an outer circumferential surface along a circumferential direction of the rotor, and
an outer diameter $D_R$ of the rotor, an outer diameter $D_B$ of a portion of the secondary bearing which is facing the rotor, and a pitch P of the multiple magnetic poles of the rotor are set to satisfy the following relationship:

$$(D_R-P) =< D_B =< D_R \qquad \text{(Formula 1)}.$$

2. The stepping motor according to claim 1, wherein the magnetic poles are arranged only on the outer circumferential surface of the rotor.

3. The stepping motor according to claim 2, wherein the secondary bearing includes a small diameter portion and a large diameter portion, the small diameter portion is affixed to a covering member, and the large diameter portion faces an end surface of the rotor.

4. The stepping motor according to claim 3, wherein a resin washer is arranged between the rotor and the secondary bearing.

5. The stepping motor according to claim 2, wherein a resin washer is arranged between the rotor and the secondary bearing.

6. The stepping motor according to claim 1, wherein the secondary bearing includes a small diameter portion and a large diameter portion, the small diameter portion is affixed to a covering member, and the large diameter portion faces an end surface of the rotor.

7. The stepping motor according to claim 6, wherein a resin washer is arranged between the rotor and the secondary bearing.

8. The stepping motor according to claim 1, wherein a resin washer is arranged between the rotor and the secondary bearing.

* * * * *